United States Patent [19]

Zimmermann

[11] Patent Number: 4,676,385
[45] Date of Patent: Jun. 30, 1987

[54] INSULATING FLASK FOR LIQUIDS

[75] Inventor: Anso Zimmermann, Niederaula, Fed. Rep. of Germany

[73] Assignee: Rotpunkt Dr. Anso Zimmermann, Niederaula, Fed. Rep. of Germany

[21] Appl. No.: 675,406

[22] Filed: Nov. 27, 1984

[30] Foreign Application Priority Data

Dec. 2, 1983 [DE] Fed. Rep. of Germany ... 8334684[U]

[51] Int. Cl.⁴ .............................................. A47J 41/00
[52] U.S. Cl. .................................. 215/1 C; 215/13 R; 220/94 A
[58] Field of Search .................... 220/94 A; 215/13 R, 215/1 C

[56] References Cited

U.S. PATENT DOCUMENTS

| | | | |
|---|---|---|---|
| 3,371,807 | 3/1968 | Clooser et al. | 215/13 R |
| 4,125,207 | 11/1978 | Ernst et al. | 220/94 A |
| 4,193,699 | 3/1980 | Haygeman et al. | 229/94 A |
| 4,368,827 | 1/1983 | Thompson | 220/94 A |
| 4,473,161 | 9/1984 | Zimmerman | 215/13 R |
| 4,489,840 | 12/1984 | DeFreitas | 215/13 R |

Primary Examiner—Joseph Man-Fu Moy
Attorney, Agent, or Firm—Lewis H. Eslinger

[57] ABSTRACT

An insulating flask for liquids is provided in which the protective casing is made by plastic blow-moulding with an integral hollow handle formed thereon.

3 Claims, 2 Drawing Figures

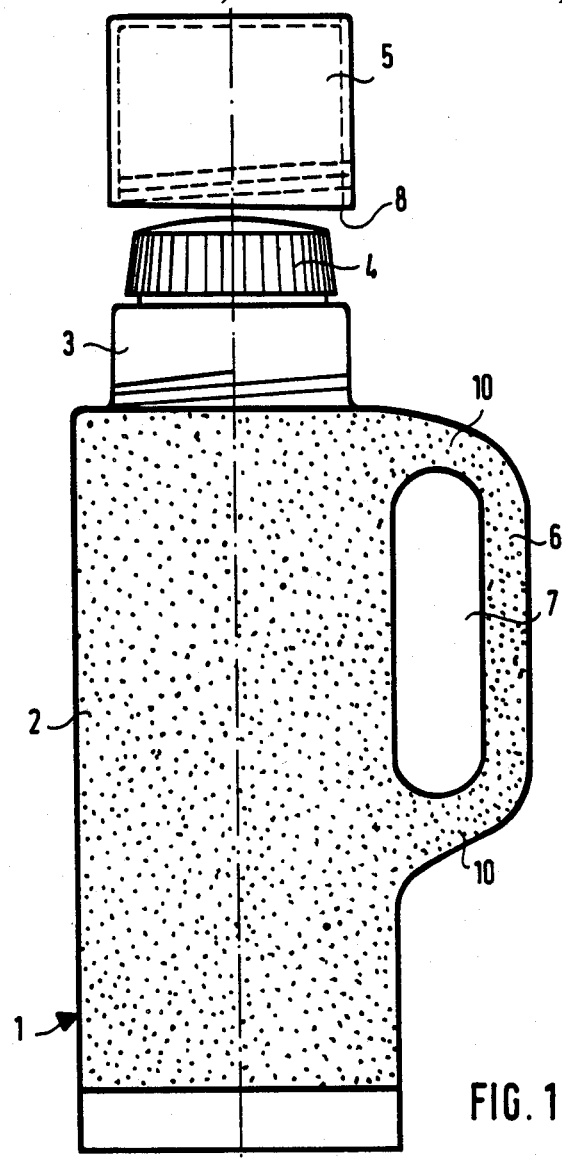
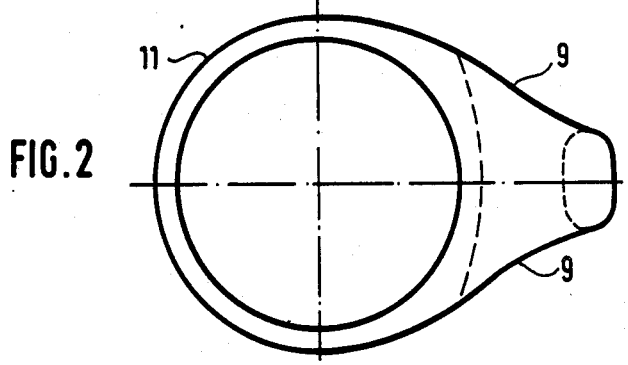

INSULATING FLASK FOR LIQUIDS

TECHNICAL FIELD OF THE INVENTION

The invention relates to an insulating flask for liquids having an insulating vessel surrounded by a protective casing and having an upper opening for filling or pouring, the protective casing having a rounded pouring rim at its rim, and in which the filling or pouring opening can be closed by a closure member and, if desired, covered by a protective cap.

BRIEF DESCRIPTION OF THE PRIOR ART

Such insulating flasks are known and are widely used. For use as flasks to be packed in bags or the like they have an elongated casing to be grasped by the user's hand. As a rule, the known insulating flasks have concave or convex deformations on the surface of the jacket to provide a more secure grip.

The known measures are, however, insufficient to ensure that the insulating flask is convenient to handle. For old people or children, for example, handling the known insulating flasks involves uncertainty or may hardly be possible.

Because insulating flasks are mass-produced, an economical solution of the problem set out above is needed.

OBJECT OF THE INVENTION

The problem underlying the invention is to improve the handling of the insulating flasks by economical means.

BRIEF DESCRIPTION OF THE INVENTION

The problem is solved by making the protective casing by plastic blow-moulding and forming a hollow integral handle thereon.

An insulating flask designed in this way can easily and conveniently be handled by the use of the handle. Since the handle is blown simultaneously and integrally with the protective casing, extra costs only arise from the increased costs of materials and tooling. The material costs are kept to a supportable level since the handle is hollow, while the increased tooling costs can readily be amortised in mass-production.

The further features of (a) forming the side faces of the cross-bars that connect the handle with the jacket surface of the protective casing so that they merge substantially tangentially with the jacket surface; (b) forming the handle opening as a substantially uniformly wide slot; (c) making the handle oval in horizontal section; and (d) embossing at least the outer surface of the handle likewise improve the handling, since they make the flask easier to take hold of and to grasp. These features fit well in the hand. Furthermore, feature (b) gives a handle that projects to a relatively small extent from the protective casing and, therefore, forms hardly any hindrance to packing the flask.

Feature (a) provides a further advantage that gives satisfactory stability.

The handling is likewise improved by attaching the upper end of the handle close to the underside of the cap, since relative to the center of gravity there is a favorable relationship of the distances at which the forces act when the insulating flask is handled.

BRIEF DESCRIPTION OF THE DRAWINGS

One embodiment of the invention will now be described with reference to a simplified drawing in which:

FIG. 1 shows a side elevation of an insulating flask constructed according to the invention, and FIG. 2 shows the insulating flask in plan view from above.

DETAILED DESCRIPTION OF THE PREFERRED EMBODIMENT OF THE INVENTION

The insulating flask indicated generally by 1 comprises a protective casing 2 in which a receptacle for the liquid (not shown) is arranged, a narrowed casing neck 3 onto which a screw closure 4 and a protective cap 5 can be fastened and which also forms a rounded pouring rim (not shown) that is covered by the screw closure 4 and a handle formed integrally onto the protective casing 2.

The handle 6 has a handle opening 7 in the form of a slot and begins directly beneath the neck 3 of the casing and directly beneath the bottom edge 8 of the protective cap 5 (shown lifted off) when this is screwed on.

As can best be seen from FIG. 2, the handle 6 is formed substantially oval in section, and in the region of the cross-bars 10 that connect it to the protective casing 2 its side faces 9 merge substantially tangentially with the jacket surface 11 of the protective casing 2.

The dots shown in FIG. 1 on the substantially cylindrical protective casing 2 and the handle 6 indicate embossing of the surfaces.

What is claimed is:

1. An insulating flask for liquids of the kind having an upper opening for filling and pouring and a closure member for closing the opening, the flask comprising:
   an insulating vessel for containing the liquids;
   a substantially hollow protective casing surrounding said insulating vessel and being formed of blow-molded plastic; and
   a substantially hollow handle being integrally formed with said protective casing and being formed of blow-molded plastic, whereby an interior of said hollow protective casing surrounding said insulating vessel and an interior of said hollow, integrally formed handle are in fluid communication, said hollow handle being attached to said hollow protective casing at an upper end proximate said upper opening and at a lower end proximate a closed bottom end of said hollow protective casing to form a slotted handle opening of uniform width, and further comprising integrally formed, blow-molded plastic, hollow cross bars for connecting the handle with the surface of the protective casing, said cross-bars being formed to merge substantially tangentially with the surface of the protective casing.

2. Insulating flask according to claim 1, characterized in that the handle is oval in horizontal section.

3. Insulated flask according to claim 1, characterized in that the handle opening has the form of a substantially uniformly wide slot.

* * * * *